(12) United States Patent
Riess et al.

(10) Patent No.: US 12,492,582 B2
(45) Date of Patent: Dec. 9, 2025

(54) OPENING AND CLOSING DEVICE FOR A MOTOR VEHICLE

(71) Applicant: Weber GmbH & Co., KG, Dillenburg (DE)

(72) Inventors: Markus Riess, Eschenburg-Wissenbach (DE); Volker Kirch, Gladenbach-Mornshausen (DE)

(73) Assignee: Weber GmbH & CO, KG, Dillenburg (DE)

( * ) Notice: Subject to any disclaimer, the term of this patent is extended or adjusted under 35 U.S.C. 154(b) by 464 days.

(21) Appl. No.: 18/063,097

(22) Filed: Dec. 8, 2022

(65) Prior Publication Data

US 2023/0279703 A1 Sep. 7, 2023

(30) Foreign Application Priority Data

Jan. 17, 2022 (DE) .......................... 102022100997.1

(51) Int. Cl.
| | |
|---|---|
| *E05B 83/28* | (2014.01) |
| *E05B 79/20* | (2014.01) |
| *E05B 81/06* | (2014.01) |
| *E05B 81/20* | (2014.01) |
| *E05B 81/30* | (2014.01) |
| *E05B 81/90* | (2014.01) |
| *E05B 85/24* | (2014.01) |

(52) U.S. Cl.
CPC .............. *E05B 83/28* (2013.01); *E05B 79/20* (2013.01); *E05B 81/06* (2013.01); *E05B 81/20* (2013.01); *E05B 81/30* (2013.01); *E05B 81/90* (2013.01); *E05B 85/24* (2013.01)

(58) Field of Classification Search
CPC .......... E05B 83/28; E05B 83/34; E05B 83/30; E05B 79/20; B60K 15/05; B60K 2015/0515; B60K 2015/053; B60K 2015/0538; B60K 2015/0561; B60K 2015/0576
See application file for complete search history.

(56) References Cited

U.S. PATENT DOCUMENTS

| | | | | |
|---|---|---|---|---|
| 497,628 | A * | 5/1893 | Cathrein | ................. E05B 47/02 292/141 |
| 2,259,652 | A * | 10/1941 | Mikolajczak | .......... B60K 15/05 292/144 |
| 2,266,119 | A * | 12/1941 | Jacobi | ..................... E05B 83/30 292/227 |

(Continued)

FOREIGN PATENT DOCUMENTS

| | | | | |
|---|---|---|---|---|
| CN | 104481313 A * | 4/2015 | ............. B60K 15/05 |
| DE | 3738367 A1 | 5/1989 | |

(Continued)

*Primary Examiner* — Christine M Mills
*Assistant Examiner* — Faria F Ahmad
(74) *Attorney, Agent, or Firm* — Rogowski Law LLC

(57) ABSTRACT

An opening and closing device (2) for a motor vehicle has a rotatably mounted flap (10), at least one latching element (84) and a latch (34) with a connecting link (42). The appertaining latching element (84) is arranged on an end of the flap (10) that faces away from a pivot bearing. A latch actuator (50) is provided to rotate the latch (34), while the connecting link (42) has a guide structure (92) for a latching end (86) of the appertaining latching element (84).

19 Claims, 10 Drawing Sheets

(56) References Cited

U.S. PATENT DOCUMENTS

| | | | | | |
|---|---|---|---|---|---|
| 2,301,282 | A | * | 11/1942 | Jacobi | E05B 83/30 292/227 |
| 2,306,022 | A | * | 12/1942 | Lach | E05B 83/30 70/370 |
| 2,313,711 | A | * | 3/1943 | Jacobi | E05B 83/30 70/145 |
| 2,313,712 | A | * | 3/1943 | Jacobi | E05B 83/30 70/451 |
| 2,318,490 | A | * | 5/1943 | Jacobi | E05B 83/30 70/81 |
| 2,454,926 | A | * | 11/1948 | Jacobi | E05B 83/30 70/84 |
| 2,570,556 | A | * | 10/1951 | Jacobi | E05B 83/30 70/370 |
| 3,429,153 | A | * | 2/1969 | Magyar | E05C 3/24 292/216 |
| RE31,899 | E | * | 5/1985 | Mochida | E05B 79/20 292/336.3 |
| 4,758,811 | A | * | 7/1988 | Slavin | H01F 7/1615 335/230 |
| 5,316,365 | A | * | 5/1994 | Kuhlman | E05F 15/646 49/216 |
| 5,533,766 | A | * | 7/1996 | Farber | E05B 83/34 292/201 |
| 5,769,481 | A | * | 6/1998 | Cooper | B60J 5/06 296/97.22 |
| 6,234,556 | B1 | * | 5/2001 | Janssen | B60K 15/05 296/97.22 |
| 6,394,511 | B1 | * | 5/2002 | Lam | E05B 83/16 292/DIG. 43 |
| 6,536,814 | B2 | * | 3/2003 | Kachouh | E05B 81/14 292/201 |
| 6,550,825 | B2 | * | 4/2003 | Ostrowski | E05B 81/20 292/201 |
| 6,988,749 | B2 | * | 1/2006 | Hashiba | E05B 81/54 292/216 |
| 7,766,397 | B2 | * | 8/2010 | Carabalona | E05B 81/20 292/201 |
| 7,815,230 | B2 | * | 10/2010 | Yoshikuwa | E05B 81/25 292/216 |
| 8,528,948 | B2 | * | 9/2013 | Bettin | E05B 81/38 292/201 |
| 8,672,368 | B2 | * | 3/2014 | Grosdemouge | E05B 85/02 292/216 |
| 9,484,914 | B2 | * | 11/2016 | Pohl | B60J 5/00 |
| 10,100,558 | B2 | * | 10/2018 | Graute | E05B 79/02 |
| 11,306,517 | B2 | * | 4/2022 | Ilea | B60N 2/366 |
| 11,555,338 | B2 | * | 1/2023 | Nagaoka | E05B 77/36 |
| 11,624,217 | B2 | * | 4/2023 | Krishnan | E05B 83/24 292/336.3 |
| 11,673,466 | B2 | * | 6/2023 | Sha | E05B 81/36 49/281 |
| 11,927,045 | B2 | * | 3/2024 | Wietkamp | E05F 15/627 |
| 12,152,421 | B2 | * | 11/2024 | Hegwein | B60K 15/05 |
| 2002/0093207 | A1 | * | 7/2002 | Ehret | E05B 79/20 292/216 |
| 2004/0051333 | A1 | * | 3/2004 | Brown | E05B 83/30 296/37.12 |
| 2004/0232706 | A1 | * | 11/2004 | Kurten | E05B 81/40 292/216 |
| 2005/0039404 | A1 | * | 2/2005 | Mrkovic | E05F 15/646 192/48.2 |
| 2005/0134054 | A1 | * | 6/2005 | Stefanic | E05B 81/14 292/201 |
| 2005/0230999 | A1 | * | 10/2005 | Seto | B60K 15/05 296/97.22 |
| 2005/0284201 | A1 | * | 12/2005 | Kachouh | H02K 7/06 70/416 |
| 2006/0028031 | A1 | * | 2/2006 | Tibbenham | B60R 11/00 292/336.3 |
| 2007/0138802 | A1 | * | 6/2007 | Stasko | E05B 79/20 292/201 |
| 2011/0012380 | A1 | * | 1/2011 | Bendel | E05B 81/46 292/341.16 |
| 2012/0032457 | A1 | * | 2/2012 | Ishikawa | E05B 83/26 292/336.3 |
| 2014/0175812 | A1 | * | 6/2014 | Wirths | E05B 77/02 292/194 |
| 2014/0239646 | A1 | * | 8/2014 | Betzen | E05B 81/40 292/139 |
| 2015/0035293 | A1 | * | 2/2015 | Vigneau | E05C 19/022 292/198 |
| 2015/0069766 | A1 | * | 3/2015 | Estrada | E05B 77/12 292/194 |
| 2015/0183316 | A1 | * | 7/2015 | Wakamatsu | B60K 15/05 340/426.24 |
| 2015/0375630 | A1 | * | 12/2015 | Jeong | B60L 53/16 49/386 |
| 2016/0108648 | A1 | * | 4/2016 | Nam | E05B 17/0037 292/142 |
| 2016/0177602 | A1 | * | 6/2016 | Graute | E05B 81/20 74/424.71 |
| 2016/0186468 | A1 | * | 6/2016 | Ilea | E05B 79/20 292/201 |
| 2016/0201361 | A1 | * | 7/2016 | Hanaki | E05B 83/40 292/195 |
| 2016/0281400 | A1 | * | 9/2016 | Byun | E05B 79/20 |
| 2017/0328094 | A1 | * | 11/2017 | Zia | E05B 81/90 |
| 2018/0038140 | A1 | * | 2/2018 | McCarthy | E05B 79/20 |
| 2018/0058116 | A1 | * | 3/2018 | Erices | E05B 83/18 |
| 2018/0171679 | A1 | * | 6/2018 | Im | E05B 79/20 |
| 2018/0230718 | A1 | * | 8/2018 | Menke | E05B 15/022 |
| 2018/0258671 | A1 | * | 9/2018 | Graute | E05B 81/50 |
| 2019/0184819 | A1 | * | 6/2019 | Kato | B60K 15/05 |
| 2020/0079210 | A1 | * | 3/2020 | Jeon | B60K 15/05 |
| 2020/0318400 | A1 | * | 10/2020 | Johann | E05B 81/14 |
| 2021/0372169 | A1 | * | 12/2021 | Patane | E05B 81/66 |
| 2022/0290476 | A1 | * | 9/2022 | Hegwein | E05B 81/42 |
| 2023/0111658 | A1 | * | 4/2023 | Kalra | E05B 83/36 49/503 |
| 2023/0349205 | A1 | * | 11/2023 | Jeong | B60L 53/16 |
| 2023/0399885 | A1 | * | 12/2023 | Bastian | B60K 15/05 |
| 2024/0157783 | A1 | * | 5/2024 | Kaneko | B60K 15/05 |

FOREIGN PATENT DOCUMENTS

| | | | | |
|---|---|---|---|---|
| DE | 102012015227 | A1 | * | 2/2014 ............ B60K 15/05 |
| DE | 102013212772 | A1 | | 12/2014 |
| DE | 102013109961 | A1 | | 3/2015 |
| DE | 102016107094 | A1 | * | 10/2017 ............ B60K 15/05 |
| DE | 202016106308 | U1 | * | 3/2018 ............ B60N 2/20 |
| DE | 102019122109 | A1 | * | 2/2021 |
| DE | 102023100575 | A1 | * | 7/2023 ............ B60K 15/05 |
| EP | 0846585 | A2 | * | 6/1998 |

* cited by examiner

OPENING AND CLOSING DEVICE FOR A MOTOR VEHICLE

BACKGROUND OF THE INVENTION

Technical Field and State of the Art

The invention relates to an opening and closing device for a motor vehicle, comprising a rotatably mounted flap, at least one latching element and a latch with a connecting link.

Motor vehicles have on their body or exterior flaps or lids which cover, for example, a charging cradle in electric vehicles or the gas tank port in vehicles with an internal combustion engine. In this process, the flap is flipped open to the side when the vehicle is about to be charged and the charging cradle has to be accessible. In its closed state, the flap should properly protect and shield the charging cradle from external and environmental influences. For this purpose, normally a seal is also provided on which the flap rests when in the closed state.

In order to make it possible for the motor vehicle to be available and ready to be used at all times, the charging cradle has to be accessible at the desired point in time. This especially means that the driver should be able to open the flap without having to use any tools. Activating the flap might become considerably more difficult due to external influences such as extreme cold, ice or snow. Especially in conjunction with ice build-up, opening and closing the flap can be rendered difficult. In the case of a strong snowfall, it might be difficult to make contact with the seal when closing the flap.

Actuators can be employed in order to mechanically assist the user to operate the flap. German patent application DE 10 2013 109 961 A1 discloses a latching mechanism with a connecting link and latch tappets that serve to keep the lids closed in motor vehicles.

SUMMARY OF THE INVENTION

The invention of the present application is based on an objective of putting forward a device and a method involving a flap so as to assist the user to open and close the flap.

According to an embodiment of the invention, the appertaining latching element is arranged on an end of the flap that faces away from the pivot bearing. A latch actuator is provided to rotate the latch, while a connecting link has a guide structure for a latching end of the appertaining latching element.

This embodiment of the invention is based on the consideration that a device should assist the user to operate the flap in that it applies an opening and a shutting force. This assistance functionality should be provided over a prescribed path of especially 10 mm starting from the closed position.

As has now been recognized, these requirements can be met in that one end of at least one latching element connected to the flap is guided in a connecting link of a pivotable latch that can be driven by an actuator or motor, this being done in such a way that, as a result of the rotation of the latch by means of an actuator, the flap is moved in the direction of the closed position in order to close the flap, and then the flap is moved away from the closed position by means of a counter rotation of the latch.

Advantageously, the latch is built symmetrically relative to a central plane, wherein two latching elements are provided, each of which symmetrically engages by means of the latching end with the guide structure on one side. This allows uniform application of force onto the lid or flap. The forces in the axial direction cancel each other out.

The appertaining latching end is preferably configured so as to be hook-shaped. In this context, an essential aspect for the latching are the functional surfaces created perpendicular to the rotational axis since they transmit the forces.

Preferably, the guide structure is configured in the form of a groove or trough. In this manner, the hook-shaped latching ends can be guided in the groove, which allows a very precise guidance of the latching ends and thus a fluid and controlled movement of the flap.

In another advantageous embodiment of the invention, the guide structure is configured as a rib. The appertaining latching end of the corresponding latching element in this embodiment is preferably configured in such a way that it surrounds or encloses the rib at least in certain areas.

The latch actuator is preferably configured as an electric motor, wherein a gear drive is provided to transmit the rotational speed of a motor shaft of the latch actuator to an output shaft that is rigidly joined to the latch. In this manner, the functions of increasing the opening and closing forces can be implemented shortly before the closed position, especially in the last 10 mm, and the latching into the final position can be effectuated with the same actuator.

The gear drive advantageously has a first gearwheel that is arranged on a drive shaft, and a second gearwheel that is arranged on the output shaft.

The transmission ratio between the latch actuator and the latch or the pivotable shaft to which the latch is rigidly attached is preferably between 1:150 and 1:500, especially 1:300.

The connecting link preferably has a functional surface that provides a force transmission for increased closing force in the last interval, preferably the last 10 mm, before the closed position. It allows the flap to be latched in the end position, making it possible to come into contact with the connecting link guide, and the force can also be adjusted on the basis of the slant of the functional surfaces. The force transmission is thus possible by making contact with the connecting link guide by adjusting the slant of the functional surfaces. The latching hooks deform elastically accordingly.

Preferably, the connecting link has a clearance. This implements a push-to-open functionality for the flap. An alternative to a push-to-open clearance is also opening by means of contactless sensors that do not require clearance.

In an advantageous embodiment of the invention, the connecting link has an emergency latch-release mechanism. This permits the flap, even in the closed state, to be opened manually if the actuator fails.

The emergency latch-release mechanism advantageously has a rotary disk that is rigidly joined to the latch, wherein a cable is wound around said rotary disk. This creates a cable control.

The connecting link preferably has a beveled open end. The degree of beveling allows the resistance to be set that is felt by the user when the cable is pulled during an emergency latch-release procedure.

The device preferably has a drive housing where the latch actuator and the latch are accommodated. Preferably, the gear drive is also arranged in the drive housing. This makes it possible to protect these components against environmental influences such as, for instance, moisture or dirt.

Preferably, the connection link is configured at or on a latch. Advantageously, the connecting link or the latch is rotated when a predefined flap position is detected by means of a sensor.

A position shortly before the closed position, especially 10 mm, is preferably detected in that the rotary actuator that drives the hinge pin has a sensor which detects the angular position of the flap. The sensor also detects the angular movement of the flap in the push-to-open function and thus activates the actuator.

The flap is preferably configured as a charging flap for an electric charging cradle. It is rotatably mounted on the vehicle, preferably on the body of the vehicle. The invention also relates to a motor vehicle having the device described above, wherein the flap is rotatably mounted on the vehicle, preferably on the body of the vehicle.

According to one aspect of the invention, at least one latching element that is preferably rigidly joined to the flap is engaged with a connecting link that is rotated in an opening or closing direction.

The advantages of the invention are to be found especially in the fact that the above-mentioned requirements can be met. In particular, the opening force can be applied, and the application of a shutting force can be implemented. A clearance in the connecting link implements the push-to-open function, wherein pushing, that is to say, pressing, the flap inwards when it is in the closed position causes it to automatically open. An emergency latch-release mechanism allows the flap to be opened in the absence of power.

An embodiment of the invention will be elucidated on the basis of a drawing. In this context, all of the described and/or depicted features, either on their own or in any meaningful combination, constitute the subject matter of the present invention, also irrespective of their compilation in the claims or the claims to which they refer back.

DESCRIPTION OF THE DRAWINGS

The following is depicted, at times schematically.

Identical parts are provided with the same reference numerals in all of the figures.

DETAILED DESCRIPTION

Figure 1:
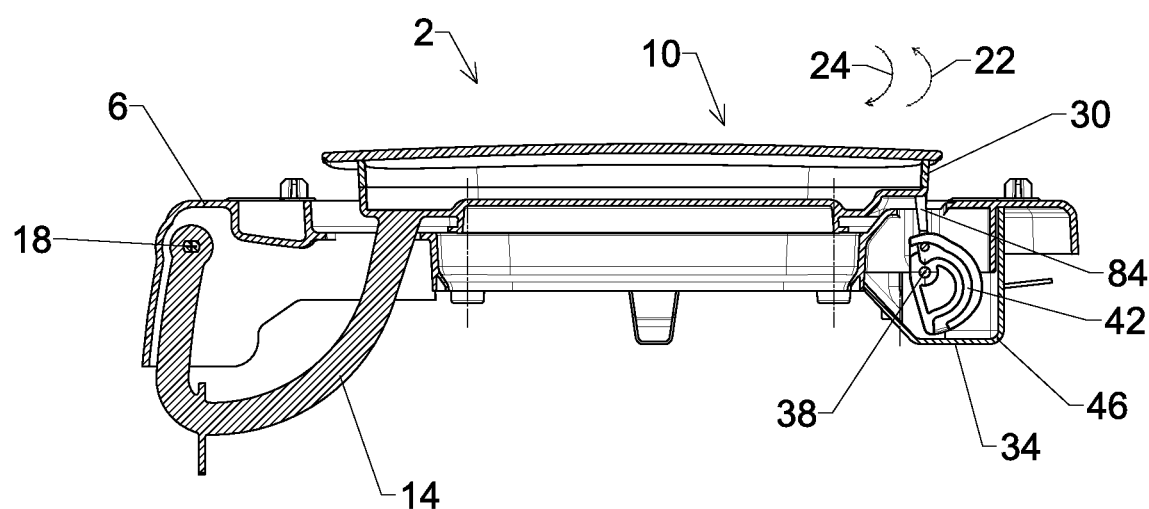
FIG. 1 an opening and closing device, in a lateral sectional view.

FIG. 1 shows an opening and closing device 2 that has a cover or flap 10 which is mounted so that it can be rotated around a hinge pin 18 in an opening direction 22 by means of a hinge arm 14. The flap 10 can cover, for example, an electric charging port or a charging cradle or cradle 6 for a motor vehicle and it can be flipped away in the opening direction 22 to allow charging.

The device 2 also comprises a flap adapter 30 or cover adapter. The flap adapter 30 functions as an adapter for several car body models. This makes it possible to use the same basic module for various vehicles so that only the flap adapter 30 and the flap 10 are individually replaced as a function of the car body model.

Figure 2:
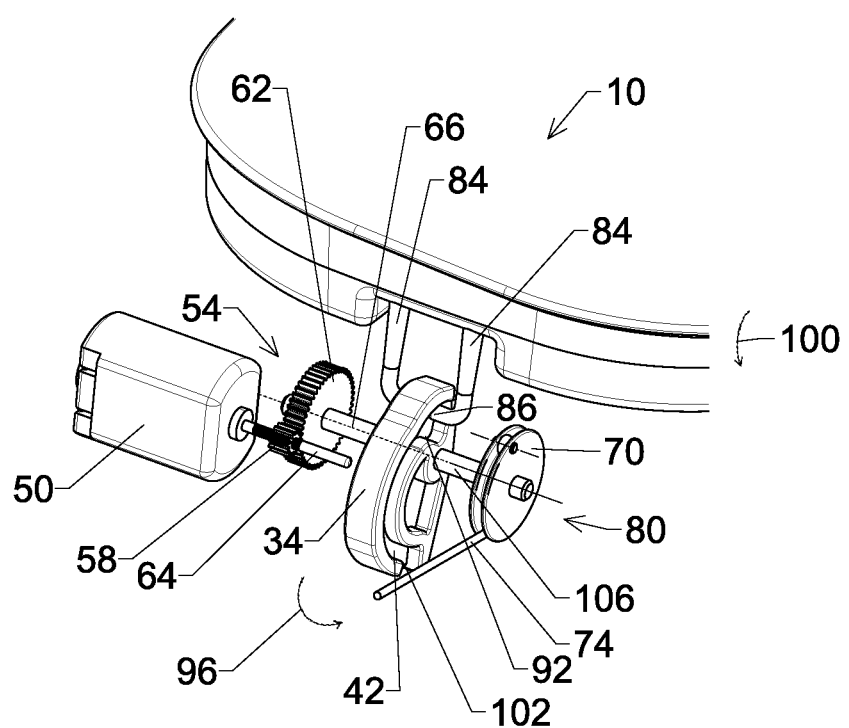
FIG. 2 parts of the device as shown in FIG. 1, in an exploded view.

The device 2 is configured to provide enhanced opening and closing force. For this purpose—in this context, also see FIG. 2-*a* latch 34 is rotatably mounted around a latch pin 38. The latch 34 has a connecting link 42. Accommodated in a drive housing 46 are the latch 34 as well as a latch actuator 50 that is configured here as an electric motor, also a gear drive 54 having a first, here small, gearwheel 58 and a second, here large, gearwheel 62. The small gearwheel 58 is arranged on a drive shaft 64 that is driven by the latch actuator 50.

The large gearwheel 62 is arranged on an output shaft 66 that is rigidly joined to the latch 34.

Figure 10:
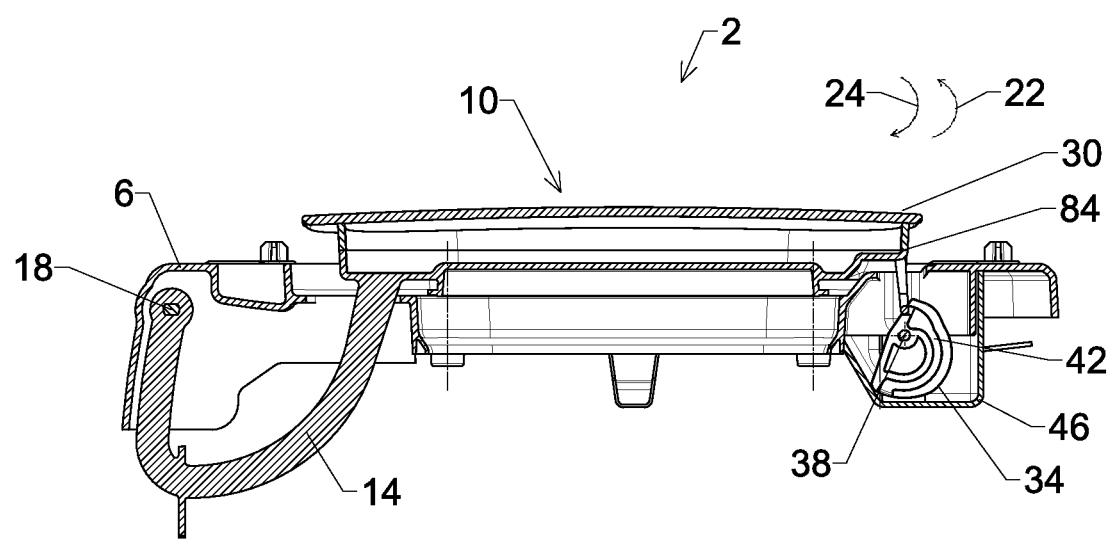

The transmission ratio between the latch actuator 50 and the latch 34 is preferably within the range from 1:150 to 1:500, especially 1:300. This transmission ratio is not depicted in the drawings, the gearwheels are depicted symbolically and schematically. On the side of the latch 34 opposite to the large gearwheel 62, there is a rotary disk 70 that is rigidly joined to the output shaft 66, whereby a cable 74 is wound around said rotary disk 70. Together, the rotary disk 70 and the cable 74 form an emergency latch-release mechanism 80. FIG. 10 shows the device 2 in an emergency latch-release position.

Two hook-shaped latching elements 84 are rigidly joined to the flap 10 and they are configured to each be guided with their respective latching ends 86 in a guide structure 92 of the connecting link 42. The appertaining latching end 86 is configured here so as to be hook-shaped. Since the piece of the latching element 84 that adjoins the appertaining latching end 86 is configured here so as to be essentially straight, the latching elements 84 as a whole are likewise configured so as to be hook-shaped.

The latching elements 84 preferably protrude perpendicularly to the flap 10 in the direction of the latch 34. In their straight pieces, the latching elements 84 run parallel to the lateral surfaces of the latch 34.

A rotation of the drive shaft 64 causes the output shaft 66 to likewise rotate, so that the latch 34 is set into rotation. When the latch 34 is rotated in the rotational closing direction 96, the flap 10 rotates in the closing direction 100 until it is completely closed. This is achieved in that the latching elements 84 run in the guide structure 92. The latch pin 38 and the course of the guide structure 92 are designed in such a way that a rotation of the latch 34 or of its connecting link in the rotational closing direction 96 causes the flap 10 to rotate in the closing direction 100.

The radial helical constriction of the guide structure 92 causes a force increase as a function of the rotational angle of the latch 34. The gradient of this constriction effectuates the force and can be designed in accordance with the requirements. A different gradient in the connection link 42 can be applied in the closing direction and in the opening direction, as a result of which, at the same rotational speed, the forces and times in the opening and closing directions differ.

The guide structure 92 has an open end 102 on which the end of the latching element 84 facing away from the flap 10 is located when the flap 10 is in a closed state. In this state, the flap 10 can be manually opened by means of the emergency latch-release mechanism 80 in that the operator pulls on the cable 74 or cable control. This causes the rotary disk 70 to rotate, along with an emergency latch-release shaft 106 that is non-rotatably joined to the rotary disk 70. The emergency latch-release shaft 106, in turn, is rigidly or non-rotatably joined to the latch 34 and/or to the output shaft 66. In this manner, pulling on the cable 74 causes the latch 34 to rotate in such a way that the latching element 84 leaves the guide structure 92 at the open end 102 and the flap 10 can then be opened.

By means of the selection of the beveling of the open end 102 relative to the guide structure 92, it is possible to set the force that is needed for the release. The cable end 74 that is not arranged on or fastened to the rotary disk 70 is arranged outside of the drive housing 46 so that the user can reach it if it becomes necessary to release the flap 10 in an emergency.

Since two latching elements 84 are provided in the present embodiment, the latch 34 has a connection link 42 with a guide structure 92 on each side, so that the above-mentioned description applies accordingly to both sides of the latch.

In FIG. 1, the device 2 is shown in a position in which the flap 10 is at a distance of approximately 10 mm from the completely closed end position, as seen in the closing direction 24. In this position, the appertaining latching element 84 is engaged with the guide structure 92 of the connection link 42 of the latch 34. As soon as the flap 10 is in this position, the latch 34 is rotated in the rotational closing direction 96 by means of the latch actuator 50, see FIG. 2, so that the flap 10 is moved further in the direction of its completely closed position. This assists the user when the flap is being closed. In the opposite rotational direction, the user receives assistance when the flap is being opened. The distance of 10 mm is given by way of an example and can also be chosen differently; in particular, it can be between 5 mm and 20 mm. The position of 10 mm before the closed position is detected in that the rotary actuator that drives the hinge pin 18 has a sensor which detects the angular position of the flap. By the same token, the angular movement of the flap in the push-to-open function is detected, in response to which the latch actuator 50 is then activated.

Figure 3:
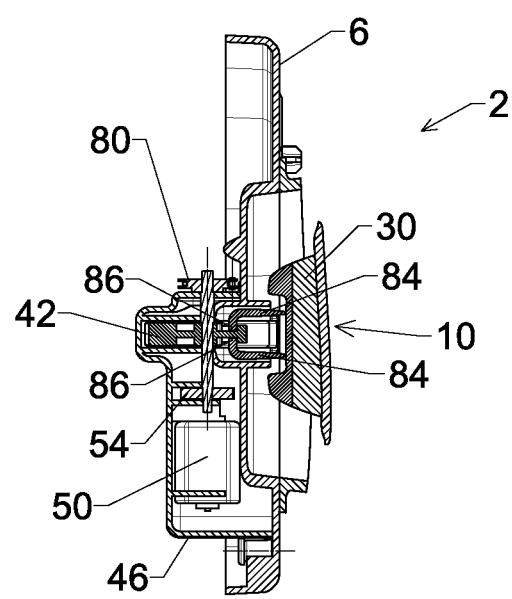
FIG. 3 the device as shown in FIG. 1, in another lateral sectional view, FIG. 4 the device as shown in FIG. 1, in an interior top view, FIG. 5 the device as shown in FIG. 1, in a push-position, FIG. 6 the device as shown in FIG. 1, in an open position, FIG. 7 a device as shown in FIG. 1, and a cradle, in an exploded view, FIG. 8 the edge of a flap with latching elements and a latch with a connecting link, FIG. 9 two depictions of the latching position, and FIG. 10 the device as shown in FIG. 1, in an emergency latch-release position.

FIG. 3 shows the device 2 in a lateral sectional view in a closed position. The drive housing 46 accommodates the latch actuator 50, the gear drive 54 and the latch 34. The drive housing 46 provides these components with protection against external influences and they can be pre-installed in this housing 46.

Figure 4:
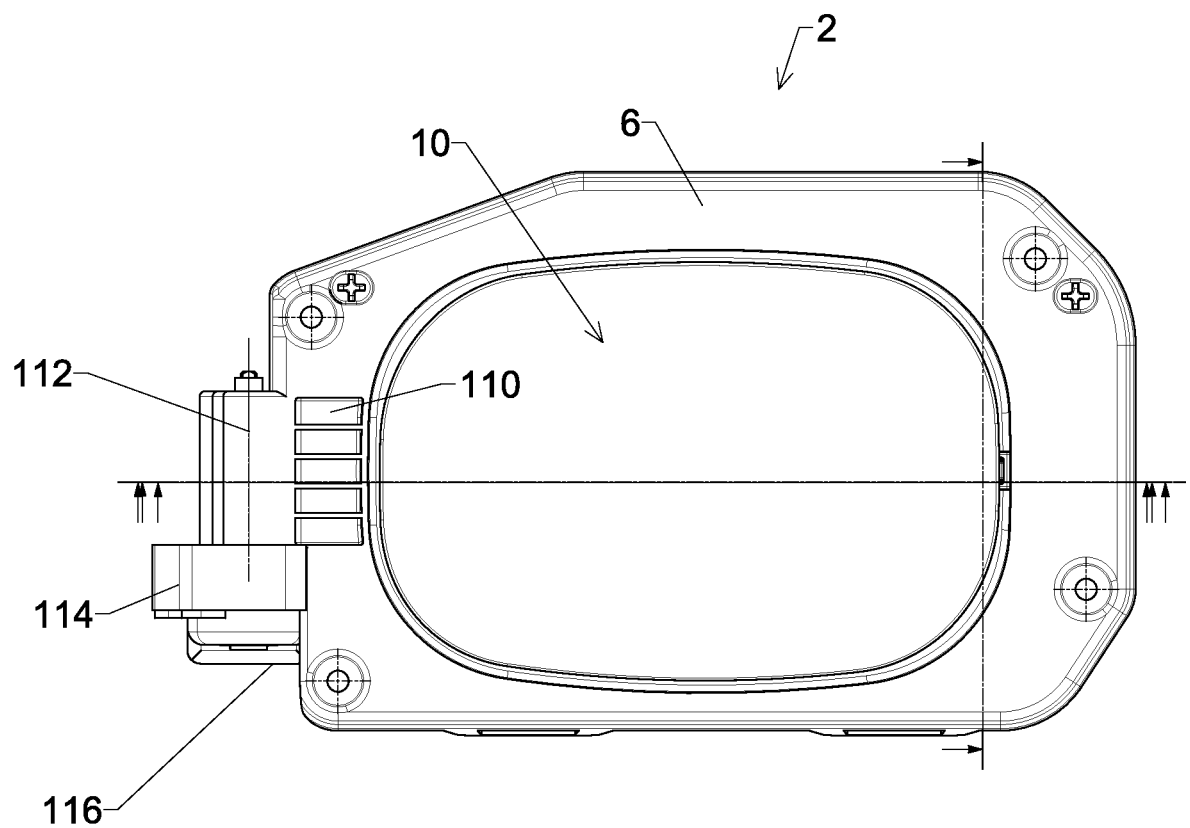

FIG. 4 shows the device 2 in a top view. The reference numeral 110 depicts a geometrical design in the cradle 6. The reference numeral 112 depicts an area of the rotational axis in the cradle 6 as the component. Moreover, this figure shows a rotary actuator receptacle 114 in the cradle 6 as well as a rotary actuator 116 with the sensor that serves to detect the angular position.

Figure 5:
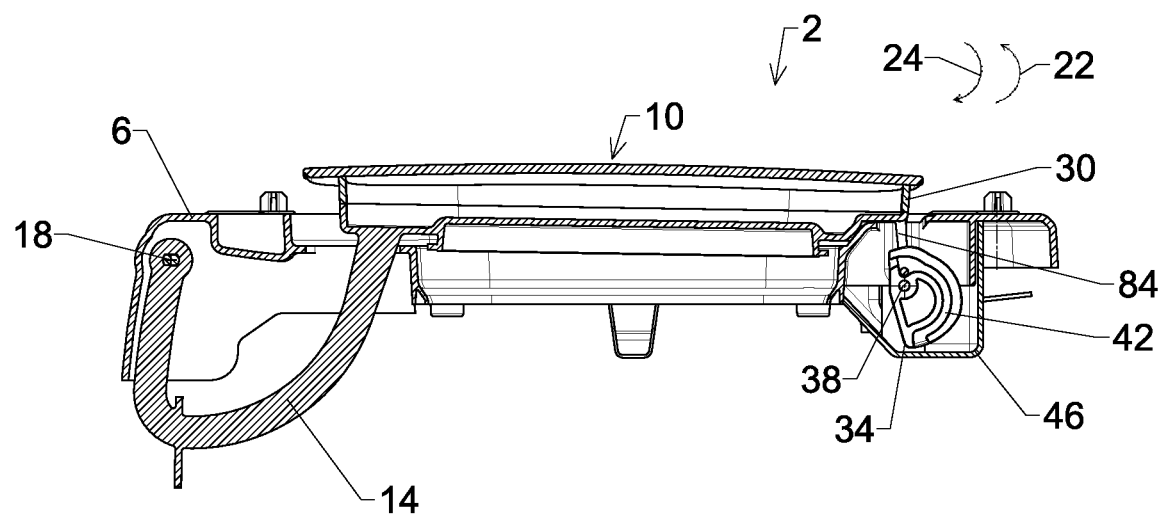

FIG. 5 shows the device 2 in a lateral view in a push-position, that is to say, the user presses onto the flap 10 or activates it. This is possible since the connecting link 42 has a clearance 150 (see FIG. 8) into which the appertaining latching element 84 can be pressed. The clearance 150 is configured as an indentation oriented essentially perpendicular to the guide structure 92.

The clearance 150 or the push-clearance in the connecting link allows the rotation of the hinge arm 14 around the rotational pin 18. The latch actuator 50 that drives the rotational pin 18 or the shaft has a sensor which detects this rotational movement and, in response, initiates the opening movement.

Figure 6:
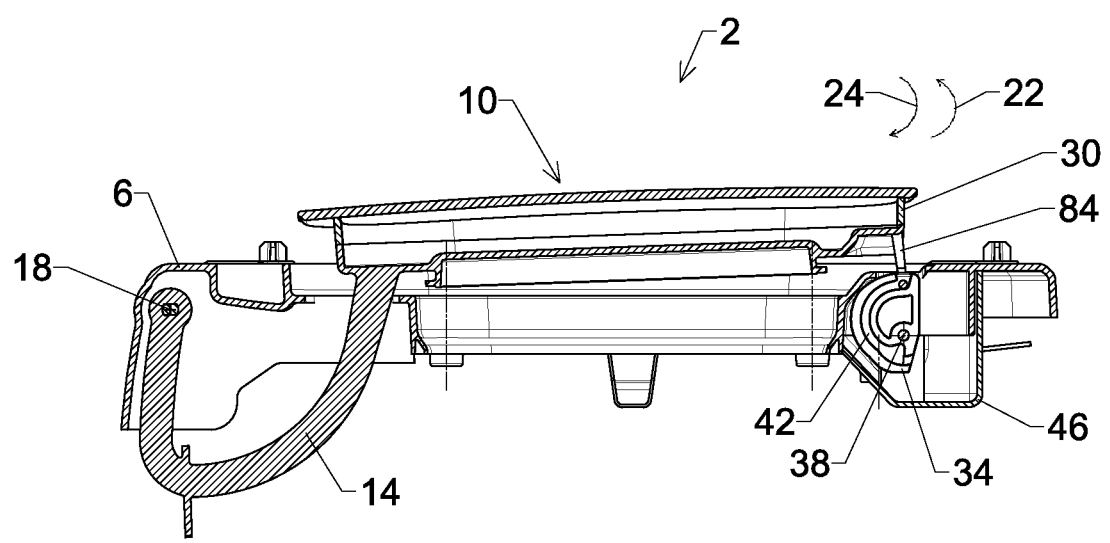

FIG. 6 shows the device 2 in a lateral view in a position 10 mm before the closed position from which the connecting link goes into function.

The appertaining latching element 84 is arranged in the open end 102 of the appertaining guide structure 92. As described in conjunction with FIG. 2, actuation of the emergency latch-release mechanism 80 allows the latching element 102 to be rotated out of the open end so that it is no longer engaged with the guide structure 92. The flap 10 can then be opened purely manually by the user. The flap 10 or the charging flap that runs in the connecting link guide with the latching elements 84 is raised by approximately 10 mm when the eccentric connecting link is rotated. At this point, the connecting link 42 is then opened towards the top and the lid or the flap 10 is thus released for opening.

Figure 7:
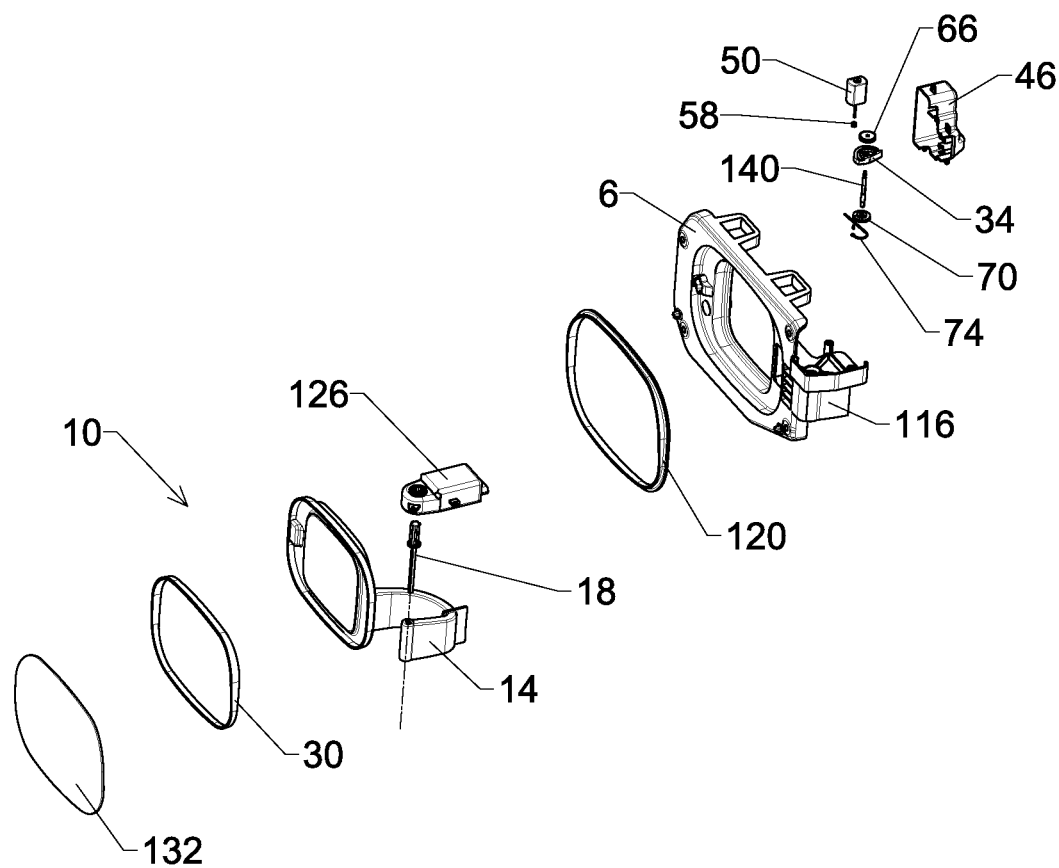

FIG. 7 shows in an exploded view the cradle 6, the flap 10, the hinge arm 14, a first adapter 120 between the cradle and the car body, a second adapter or flap adapter 30 between the flap 10 and a cover 132 (coated external part of the car body), a bearing 126 as well as the latch actuator 50 and the latch 34. Likewise shown is the area of the latch actuator 116 that drives the hinge arm 14, in the cradle.

Figure 8:
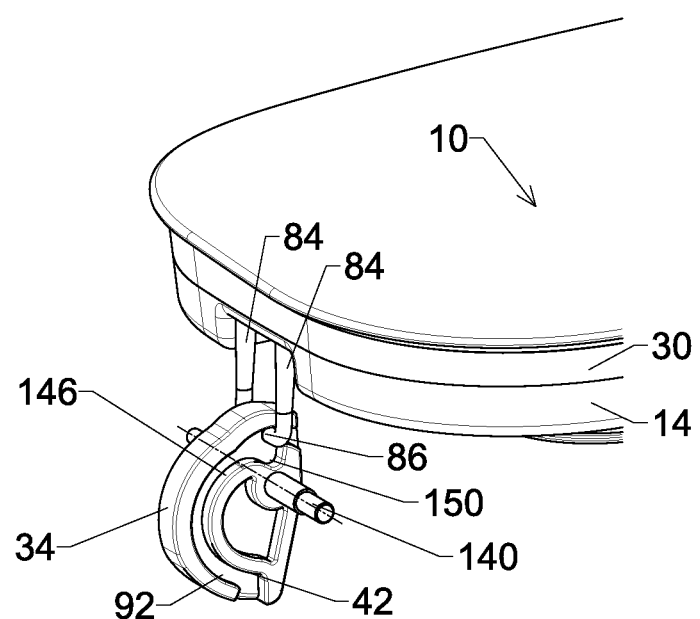

FIG. 8 shows a perspective view of a section of the flap 10 with the attached latching elements 84 having hook-shaped latching ends 86 which are guided in the trough-shaped guide structure 92 of the connecting link 42 of the latch 34. Rotation of the latch 34 by means of the latch actuator 50 around a latch shaft 140 causes the flap to be moved into an opening or closing position as appropriate and assists the user when the flap 10 is being opened or closed. Likewise shown are the clearance 150 and the functional surface 146 that transmits force for enhanced closing force in the last interval, preferably in the last 10 mm, before the closed position.

Figure 9:
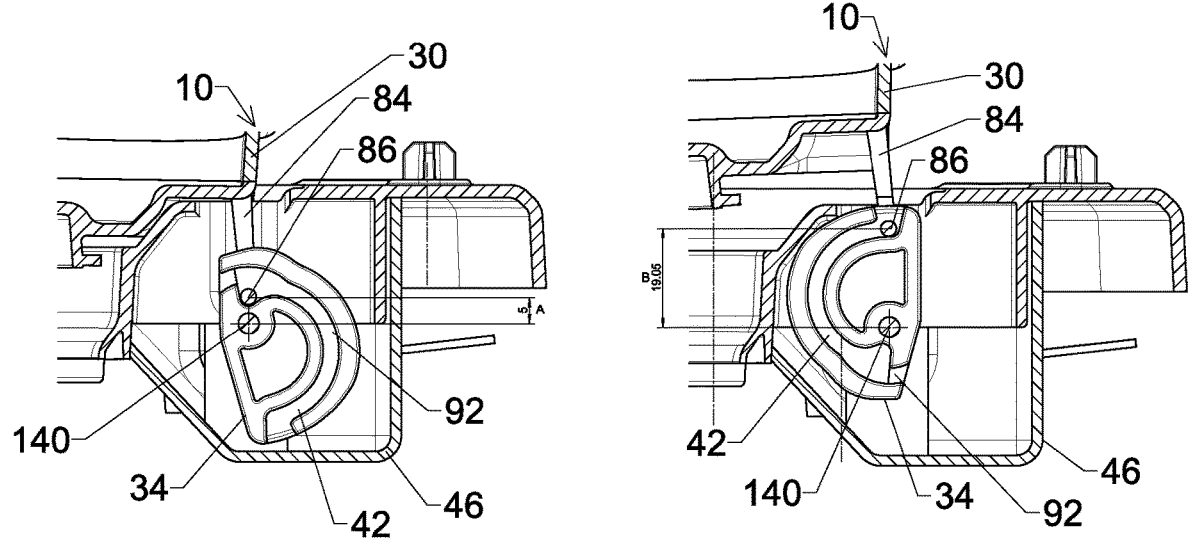

FIG. 9 shows on the left and on the right two different positions of the latch 34 and of the flap 10. In the left-hand depiction, the flap 10 is completely closed whereas in the right-hand depiction, it is approximately 10 mm away from the completely closed position. As can be seen in a comparison of both figures, a distance A between the appertaining latching end 86 of the latching elements 84 and the latch shaft 140 is considerably smaller than a distance B (right-hand depiction) between the latching end 86 of the latching elements 84 and the latch shaft 140. Between the position on the right and the position on the left, this distance diminishes continuously from B to A as the latch 34 is rotated. The guide structure becomes constricted in a somewhat helical form so that the latch makes it possible to guide the flap 10 between these two positions. The position of the latch shaft 140 and the contour of the connecting link 42 can be selected depending on the specific technical requirements and the desired selection of the distances A and B.

LIST OF REFERENCE NUMERALS 2 opening and closing device
6 cradle
10 flap, cover
14 hinge arm
18 hinge pin
22 opening direction
24 closing direction
30 flap adapter
34 latch
38 latch pin
42 connecting link
46 drive housing
50 latch actuator
54 drive gear
58 first gearwheel 62 second gearwheel
64 drive shaft
66 output shaft
70 rotary disk
74 cable
80 emergency latch-release mechanism
84 latching element
86 latching end
92 guide structure
96 rotational closing direction
100 closing direction
102 open end
106 emergency latch-release shaft
110 geometry
112 rotational axis area
114 rotary actuator receptacle
116 rotary actuator
120 adapter
126 bearing
132 cover
140 latch shaft
146 functional surface
150 clearance
A distance
B distance

The invention claimed is:

1. An opening and closing device for a rotatably mounted flap on a motor vehicle, comprising:
    two latching elements arranged on an end of the flap that faces away from a pivot bearing associated with the flap, with each latching element having a respective latching end that is hook-shaped;
    a latch with a connecting link, wherein the connecting link has a guide structure configured to receive latching ends of the latching elements and defines an open end facing away from the flap when the flap is in a closed state, wherein the latch is built symmetrically relative to a central plane, and wherein each of the latching ends of latching elements symmetrically engage with the guide structure on respective opposite sides of the guide structure so that the latching ends are within and in contact with the guide structure as the latch is rotated until the latching ends leave the guide structure at the open end; and
    a latch actuator configured to rotate the latch.

2. The device according to claim 1, wherein the latch actuator is an electric motor, and further comprising a gear drive configured to transmit the rotational speed of a motor shaft of the latch actuator to an output shaft that is rigidly joined to the latch.

3. The device according to claim 2, wherein the gear drive has a first gearwheel that is arranged on a drive shaft, and a second gearwheel that is arranged on the output shaft.

4. The device according to claim 3, wherein a transmission ratio between the latch actuator and the latch is between 1:150 and 1:500.

5. The device according to claim 1, wherein the connecting link has a functional surface.

6. The device according to claim 1, wherein the connecting link has a clearance.

7. The device according to claim 1, wherein the connecting link comprises an emergency latch-release mechanism.

8. The device according to claim 7, wherein the emergency latch-release mechanism comprises a rotary disk that is rigidly joined to the latch, whereby a cable is wound around said rotary disk.

9. The device according to claim 1, wherein the connecting link has a beveled open end.

10. The device according to claim 1, further comprising a drive housing in which the latch actuator and the latch are accommodated.

11. The device according to claim 1, wherein the flap is configured as a charging flap for an electric charging cradle.

12. A method for assisting opening and/or closing of a pivotably mounted flap associated with a motor vehicle, comprising:
    providing a device according to claim 1;
    rotating the latch to effect relative movement between the connecting link and the guide structure to either engage or disengage the latching end of the at least one latching element at the end of the flap to or from the latch.

13. An opening and closing device for a rotatably mounted flap on a motor vehicle, comprising:
    at least one latching element arranged on an end of the flap that faces away from a pivot bearing associated with the flap;
    a latch with a connecting link, wherein the connecting link has a guide structure for a latching end of the latching element;
    a latch actuator configured to rotate the latch, said latch actuator being an electric motor; and
    a gear drive configured to transmit the rotational speed of a motor shaft of the latch actuator to an output shaft that is rigidly joined to the latch.

14. The device according to claim 13, wherein the gear drive has a first gearwheel that is arranged on a drive shaft, and a second gearwheel that is arranged on the output shaft.

15. The device according to claim 14, wherein a transmission ratio between the latch actuator and the latch is between 1:150 and 1:500.

16. The device according to claim 13, wherein the connecting link comprises an emergency latch-release mechanism.

17. The device according to claim 16, wherein the emergency latch-release mechanism comprises a rotary disk that is rigidly joined to the latch, whereby a cable is would around said rotary disk.

18. The device according to claim 13, wherein the flap is configured as a charging flap for an electric charging cradle.

19. A method for assisting opening and/or closing of a pivotably mounted flap associated with a motor vehicle, comprising:
    providing a device according to claim 13;
    rotating the latch to effect relative movement between the connecting link and the guide structure to either engage or disengage the latching end of the at least one latching element at the end of the flap to or from the latch.

* * * * *